US012762057B2

(12) United States Patent
Sood et al.

(10) Patent No.: US 12,762,057 B2
(45) Date of Patent: Oct. 13, 2026

(54) TECHNIQUES FOR DATA MOVEMENT TO A CACHE IN A DISAGGREGATED DIE SYSTEM

(71) Applicant: Intel Corporation, Santa Clara, CA (US)

(72) Inventors: Kapil Sood, Portland, OR (US); Lokpraveen Mosur, Gilbert, AZ (US); Aneesh Aggarwal, Portland, OR (US); Niall D. Mcdonnell, Limerick (IE); Chitra Natarajan, Queens Village, NY (US); Ritu Gupta, Cupertino, CA (US); Edwin Verplanke, Queen Creek, AZ (US); George Leonard Tkachuk, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/987,773

(22) Filed: Nov. 15, 2022

(65) Prior Publication Data

US 2024/0160568 A1 May 16, 2024

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 7,127,561 B2 | 10/2006 | Hill et al. | |
| 9,170,946 B2 | 10/2015 | Hum et al. | |
| 9,411,725 B2 | 8/2016 | Gasparakis et al. | |
| 10,073,775 B2 | 9/2018 | Wilerkson et al. | |
| 2007/0079074 A1 | 4/2007 | Collier et al. | |
| 2010/0088472 A1* | 4/2010 | Ukai | G06F 12/0815 711/135 |
| 2014/0156950 A1 | 6/2014 | Chew | |
| 2022/0197803 A1 | 6/2022 | Gupta et al. | |
| 2023/0091974 A1 | 3/2023 | Gupta et al. | |

* cited by examiner

*Primary Examiner* — Charles J Choi
(74) *Attorney, Agent, or Firm* — Nicholson De Vos Webster & Elliott LLP

(57) ABSTRACT

Examples include techniques associated with data movement to a cache in a disaggregated die system. Examples include circuitry at a first die receiving and granting requests to move data to a first cache resident on the first die or to a second cache resident on a second die that also includes a core of a processor. The granting of the request based, at least in part, on a traffic source type associated with a source of the request.

29 Claims, 12 Drawing Sheets

*I/O CACHE ALLOCATION 200*

| IO$ Cache Partition ID | Traffic Source |
|---|---|
| 00 (P0) | IOMMU |
| 01 (P1) | CXL$ T1/T2 Devices OR expandable for traffic from PCIe devices/accelerators |
| 10 (P2) | PCIe devices/Accelerators Streaming Data |
| 11 (P3) | PCIe devices/Accelerators Streaming Data |

*FIG. 2*

*CAT Mask Table 300*

| IO RDT CLOS ID | IO$ Partition ID | IO CLOS Value |
|---|---|---|
| 0000 (0) | 00 (P0) | 000000 |
| 0001 (1) | 00 (P0) | 000100 |
| 0010 (2) | 00 (P0) | 0010000 |
| 0011 (3) | 00 (P0) | 001100 |
| 0100 (4) | 01 (P1) | 010001 |
| 0101 (5) | 01 (P1) | 010101 |
| 0110 (6) | 10 (P2) | 011010 |
| 0111 (7) | 10 (P2) | 011110 |
| 1000 (8) | 10 (P2) | 100010 |
| 1001 (9) | 10 (P2) | 100110 |
| 1010 (10) | 10 (P2) | 101010 |
| 1011 (12) | 11 (P3) | 101111 |
| 1101 (13) | 11 (P3) | 110111 |
| 1110 (14) | 11 (P3) | 111011 |
| 1111 (15) | 11 (P3) | 111111 |

*FIG. 3*

*CBB ID Table 400*

| IO CLOS Value | CBB ID |
|---|---|
| 000000 | RMID (App 0) |
| 000100 | |
| 0010000 | RMID (App 1) |
| 001100 | |
| 010001 | RMID (App 2) |
| 010101 | RMID (App 2) |
| 011010 | |
| 011110 | |
| 100010 | RMID (App 3) |
| 100110 | |
| 101010 | RMID (App 4) |
| 101111 | |
| 110111 | |
| 111011 | |
| 111111 | RMID (App 5) |

*FIG. 4*

TLP Format 600

DDIO Mode Table 700

| DDIO Mode | Behavior | TPH Bits | Static Config. | Usage Scenarios |
|---|---|---|---|---|
| **Dynamic Allocation** | Allocate cache line in the CBB LLC | HV=1'b1<br>PH=2'b01 | HV=1'b0<br>PH=n/a | • Schedule data plane apps.<br>• 5G UPF<br>• DPDK apps. |
| | Allocate cache line in IO$ | HV=1'b1<br>PH=2'b01 | HV=1'b0<br>PH=n/a | |
| **Core$ Allocation** | Allocate cache line in CBB LLC based on static information | HV=1'b1<br>PH=2'b01 | HV=1'b0<br>PH=n/a | • DPDK untuned apps. |
| **IO$ Allocation** | Allocate cache line in IO$ | HV=1'b1<br>PH=2'b01 | HV=1'b0<br>PH=n/a | • Accelerators<br>• Cloud native migration, Sharing |
| **Non-Allocating** (Write to memory) | Pull the data out of internal caches | HV=1'b1<br>PH=2'b10 | HV=1'b0<br>PH=n/a | • Debugging<br>• Baseline performance |
| | Write data to memory | HV=1'b1<br>PH=2'b10 | HV=1'b0<br>PH=n/a | |

*FIG. 7*

*Data Flow 900*

*Data Flow 1000*

*FLOW 1200*

TECHNIQUES FOR DATA MOVEMENT TO A CACHE IN A DISAGGREGATED DIE SYSTEM

TECHNICAL FIELD

Examples described herein are generally related to techniques associated with data movement within a caching hierarchy for a multi-die, disaggregated system.

BACKGROUND

In some server use cases, increases in a core count for some types of system on chips (SoCs) have led to the use of dis-aggregated dies in these types of SoCs. The dis-aggregated dies are coupled or connected together using a high-speed package interface, such as for example, an embedded multi-die interconnect bridge (EMIB). One or more input/output (I/O) agents are often disposed on one die while one or more processor cores, sometimes referred to as core building blocks (CBBs), are disposed on a separate die. Each individual die has its own cache hierarchy. A memory or a large memory side cache is typically shared across the cache hierarchies associated with each of the dies. Data communications between a processor core on the one die and an I/O agent on the separate die are typically conducted via the memory or the large monolithic memory side cache shared across the cache hierarchies associated with the two different dies. Movement of data from the I/O agent to the processor core can involve multiple data movements across the interconnect fabric and EMIB boundaries. The multiple data movements may result in relatively high data access latencies as well as relatively high interconnect power consumption. In addition, relatively high consumption of both memory bandwidth and die-to-die interconnect (EMIB) bandwidths may occur.

BRIEF DESCRIPTION OF THE DRAWINGS

FIG. 2 illustrates an example input/output (I/O) cache allocation.

FIG. 3 illustrates an example cache allocation technology (CAT) mask table.

FIG. 4 illustrates an example core building block (CBB) ID table.

FIG. 7 illustrates an example data direct I/O (DDIO) mode table.

DETAILED DESCRIPTION

Figure 1:
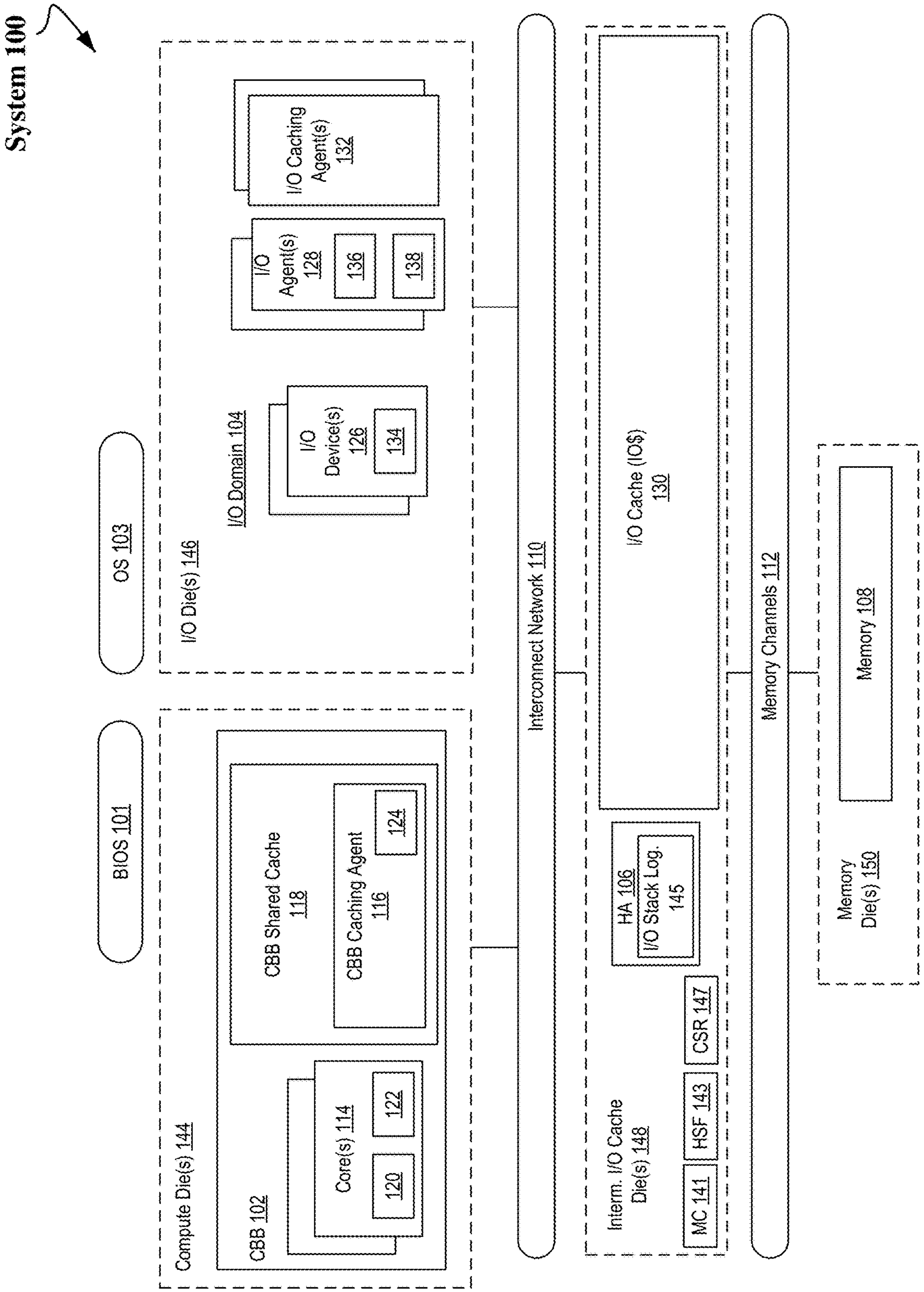
FIG. 1 illustrates an example system.

As contemplated by this disclosure, disaggregated dies included in a system on chip (SoC) may have one or more core building blocks (CBB) dies, each including a plurality of processing cores and also including one or more I/O agents on at least one other die. The one or more I/O agents can include, but are not limited to, an accelerator, a field programmable gate arrays (FPGA), an application specific integrated circuitry (ASIC), or a network interface controller/infrastructure processing unit (NIC/IPU). These types of SoCs may be used in or deployed in a network server for executing networking and packet processing workloads, which can be referred to as networking and edge (NEX) workloads. As core counts in these types of SoCs increase, scalability and performance issues can arise from a significantly large variance among different cores trying to access low level cache lines while processing a NEX workload. This can result in an undesired behavior that negatively impacts most NEX workloads. NEX workloads are also sensitive to how fast and how predictably each network packet can be processed by one or more cores, often in conjunction with on-SoC I/O agents such as accelerators.

As mentioned above, disaggregated dies in an SoC used in a network server can be constructed by putting a certain number of I/O agents on one or more dies of the SoC and a certain number of cores on another one or more dies. Each individual die typically has its own cache hierarchy. Data which needs to be communicated between a core and an I/O agent can be communicated using a next common level of cache between the different caching hierarchies, such as a memory side cache. In the absence of the memory side cache, the data to be communicated will be written to system memory (e.g., dynamic random access memory (DRAM).

Communication of data between the core and the I/O agent on separate dies through system memory or a shared memory side cache suffers from several disadvantages. A first example disadvantage is that a latency of access of the data produced by the I/O agent (e.g., incoming network NIC data) and consumed by the core (e.g., for network packet processing) is high. This high latency will likely affect packet processing bandwidth significantly as packet processing bandwidth is typically determined by a time each stage of a packet processing pipeline takes to execute. The execution can take place either on the core or on-die/external I/O agents. A second example disadvantage is an extraneous consumption of die-to-die interconnect bandwidths that can result in data congestion and extra power consumption on the die-to-die interconnect. For example, when all networking packet data is pushed to the core, but only the headers of each packet need to be processed by the core (e.g., 5G user plane function (UPG) workloads). A third example disadvantage is for cases where there is no memory side cache for the SoC and this results in data being written to system memory/DRAM. Writing data to system memory can result in wasted memory bandwidth and power. A fourth example disadvantage is if there are differences in how a networking workload is performed in relation to each task for packet processing. In some instances, a packet header can be pushed as close to the processing core or I/O agent for reduced processing latency. While in other instances, the entire packet may need to be processed by the core or I/O agent (e.g., IPsec, web servers/proxy). This disclosure describes techniques for data movement to a cache in a disaggregated die system that avoids or minimizes the need to write data to system memory or use a memory side cache.

FIG. 1 illustrates an example system 100. System 100 may be at least a portion of, for example, a server computer, a desktop computer, or a laptop computer. In some examples, as shown in FIG. 1, system 100 includes a basic I/O system (BIOS) 101 and an operating system (OS) 103. BIOS 101, for example can be arranged as a Unified Extensible Firmware Interface (UEFI) BIOS. Also, as shown in FIG. 1, system 100 includes a plurality of disaggregated dies that includes one or more compute die(s) 144, one or more I/O die(s) 146, one or more intermediate cache die(s) 148 and one or more memory die(s) 150. Also, compute die(s) 144 are shown as including a core building block (CBB) 102. I/O die(s) 146 are shown as including an I/O domain 104. Intermediate cache die(s) 148 are shown as including a home agent (HA) 106, an I/O cache (IO$) 130, a memory controller (MC) 141, a home snoop filter (HSF) 143 and control status registers (CSRs) 147. Also, as shown in FIG. 1, HA 106 includes I/O stack logic 146. Memory die(s) 150 are shown as including a memory 108. For these examples, circuitry, logic and/or features resident on compute die(s) 144, I/O die(s) 146 or intermediate cache die(s) 148 may be communicatively coupled via an interconnect network 110 that includes die-to-die or chip-to-chip interconnects between compute die(s) 144, I/O die(s) 146 and intermediate cache die(s) 148. Also, logic and/or features resident on intermediate cache die(s) 148 (e.g., HA 106 or MC 141) may be communicatively coupled to the memory 108 via one or more memory channel(s) 112.

According to some examples, communications within CBB 102 on compute die(s) 144 and within I/O domain 104 on I/O die(s) 146 may be in accordance with on-die or intra-die communication protocols, such as, but not limited to, the Intel® Intra-Die Interconnect (IDI) protocol. Communications between CBB 102, I/O domain 104, and logic and/or features resident on intermediate cache die(s) 148 across or via interconnect network 110 may be supported by inter-die or inter-chip communication protocols such as, but not limited to, the Intel® Ultra Path Interconnect (UPI) protocol or the Universal Chiplet Interconnect Express (UCIe) protocols as described in the UCIe 1.0 specification, published in March of 2022 by the UCIe™ organization ("the UCIe specification"). Data communications between the CBB 102 and the I/O domain 104, in some examples, can be facilitated by HA 106 and/or I/O stack logic 145. Also, communications between HA 106 and/or MC 141 and memory 108 across memory channels 112 can be in accordance with one or more memory access protocols, such as described in various Joint Electronic Device Engineering Council specifications for double data rate (DDR) memory access. For example, JEDEC DDR specifications to include, but not limited to, DDR3, DDR4, DDR5, LPDDR3, LPDDR4, LPDDR5, high bandwidth memory (HBM), HBM2 or HBM3. In other examples, memory access protocols via memory channel(s) 112 can be in accordance with other types of memory channel protocols such as CXL.mem memory channel protocols used in accordance with the compute express link (CXL) 3.0 specification, published in August of 2022 by the CXL™ organization ("the CXL specification").

System 100 may include additional components that facilitate the operation of the system 100. Furthermore, while an example of interconnect network 110 and memory channel(s) 112 illustrate the coupling between the disaggregated dies of system 100, alternative networks and/or memory channel configurations can be used to couple dies and/or components of system 100.

According to some examples, CBB 102 may include one or more core(s) 114, a CBB shared cache hierarchy 118, and a CBB caching agent 116. An example of a CBB shared cache hierarchy 118 is a level 3 (L3) cache. For these examples, CBB shared cache hierarchy 118 may be shared by and accessible to core(s) 114 in the CBB 102. Each core from among core(s) 114 includes a hardware circuit, such as a control circuit 120, to execute core operations and includes a core cache hierarchy 122. According to some examples, core cache hierarchy 122 includes an L1 cache and an L2 cache. CBB caching agent 116 may manage operations associated with CBB shared cache hierarchy 118. To this end, the CBB caching agent 116 includes a hardware circuit, such as a control circuit 124, to manage operations associated with CBB shared cache hierarchy 118. CBB 102 is not limited to the components shown in FIG. 1, CBB 102 may include additional components that facilitate operation of CBB 102.

In some examples, I/O domain 104 can include one or more I/O device(s) 126, one or more I/O agent(s) 128, one or more I/O caching agent(s) 132. Each I/O agent of I/O agent(s) 128 may be coupled to a respective I/O device from among I/O device(s) 126. Each I/O device of I/O device(s) 126 may include a hardware circuit, such as a control circuit 134, to manage I/O device operations. Each I/O agent from among I/O agent(s) 128 may include a hardware circuit, such as a control circuit 136, to manage I/O agent operations and an internal cache 138. Internal cache 138 may also be referred to as a write buffer or write cache (Wr$). Examples of I/O agents include, but are not limited to, accelerator device instances such as a data streaming accelerator or a host processor with multiple I/O device(s) 126 connected downstream. I/O domain 104 is not limited to the components shown in FIG. 1, I/O domain 104 may include additional components that facilitate operation of I/O domain 104. According to some examples I/O caching agent(s) 132 of I/O domain 104 includes a hardware circuit, such as a control circuit 140, to manage cache operations in collaboration with I/O agent(s) 128. As described more below, the managed cache operations may include placing writeback data from internal cache 138 to I/O cache (IO$) 130 or to CBB shared cache 118.

According to some examples, IO$ 130 resident on intermediate I/O cache die(s) 148 may be coupled to I/O agent(s)s 128 via interconnect network 110. As described more below, IO$ 130 may be a type of shared last level or L3 cache arranged as a logical standalone "scratchpad" memory that acts as an intermediate delivery stop for data received from I/O agent(s) 128.

According to some examples, logic and/or features at intermediate I/O cache die(s) 148 such as HA 106, HSF 143 or I/O stack logic 145 can be supported or included in circuitry resident on intermediate I/O cache die(s) 148. The circuitry, for example, can include one or more of an FPGA, an ASIC, a processor circuit, a multi-core processor or one or more cores of the multi-core processor. The logic and/or features at intermediate I/O cache die(s) 148 such as HA 106, HSF 143 or I/O stack logic 145 can be arranged to implement data direct I/O (DDIO) modes associated with the use of IO$ 130 and CBB shared cache 118 to meet performance objectives that may vary based on a type of workload being executed by I/O agent(s) 128, I/O device(s) 126 or core(s) 114. The performance objections, for example, can balance reducing latency, increasing processing bandwidth and attempting to reduce or minimize power usage. These different DDIO modes, for example, can be related to Intel® DDIO technology that can allow for core(s) 114 to operate on inbound data received from I/O agent(s) 128 without invoking a memory access to memory 108. Consistent with Intel® DDIO technology, a write to memory 108 only occurs upon eviction from a highest level cache. The highest level cache, depending on the selected DDIO mode, can be either CBB shared cache 118 or IO$ 130. Also, as described more below, DDIO modes can be statically configured/selected for system 100 through a UEFI BIOS such as BIOS 101 or can be dynamically configured/selected by using packet hints provided by I/O agent(s) 128. The packets hints, for example, can be included in PCI Express (PCIe) transaction layer packets (TLPs) as described in the PCIe Base Specification, Rev. 6.0, published in January of 2022 by the Peripheral Component Interconnect Special Interest Group (PCI-SIG) ("the PCIe specification"). The different DDIO modes can allow for flexibility for different networking workloads, whether those networking workloads are deployed in a network function virtualization (NFV) environment, a bare metal containers environment or as public cloud native, service mesh or virtualized containers orchestrated by Kubernetes environment that have less hardware specific awareness.

In some examples, compute domain 102 is disposed on a compute die 144 and I/O domain 104 is disposed on an I/O die(s) 146. Also, in some examples, IO$ 130, HA 106, MC 141, HSF 143 and CSR 147 are disposed on one or more intermediate I/O cache die(s) 148 and memory 108 is disposed on one or more memory die(s) 150. In alternative examples, IO$ 130, HA 106, MC 141, HSF 143 and CSR 147 may be disposed on one of compute die(s) 144, I/O die(s) 146, or memory die(s) 150. In alternative examples, multiple CBBs 102 may be disposed on a single compute die from among compute die(s) 144 and/or multiple I/O domains 104 may be disposed on a single I/O die from among I/O die(s) 146.

According to some examples, memory 108 at memory die(s) 150 may include various types of volatile and/or non-volatile memory. Volatile types of memory may include, but are not limited to, dynamic random access memory (DRAM), static random access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above.

FIG. 2 illustrates an example I/O cache allocation 200. In some examples, I/O cache allocation 200 indicates an example allocation of IO$ 130 of system 100. For these examples, IO$ 130 can be arranged to support 4 partitions that have IO$ cache partition identifiers (IDs) of P0, P1, P2 and P3. Examples are not limited to 4 partitions. Each IO$ cache partition ID may be allocated to a type of traffic source from which inbound data is to be received for processing by core(s) included in a disaggregated die SoC such as core(s) 114 of system 100. For example, IO$ cache 130 partition ID P0 is allocated to I/O agent(s) 128 that operate within a virtualization environment and utilize an I/O memory management unit (IOMMU) to perform a direct memory access to IO$ 130 or to CBB shared cache 118. IO$ cache partition ID P1 is allocated to CXL type 1 (T1)/type 2 (T2) devices from among I/O agents(s) 128 to handle data traffic from I/O agent(s) 128 that may communicate with core(s) 114 according to CXL.$ or CXL.cache protocols for cache coherency as described in the CXL specification or can be expanded to handle data traffic from I/O agent(s) 128 arranged to use PCIe protocols and/or data traffic from accelerator type devices. IO$ cache partition IDs P2 and P3 are allocated to handle streaming data traffic from I/O agent(s) 128 arranged to use PCIe protocols and/or streaming data traffic from accelerator type devices.

FIG. 3 illustrates an example cache allocation table (CAT) mask table 300. According to some examples, CAT mask table 300 can be based on a technology to allocate LLC or L3 cache (e.g., CBB shared cache 118) utilized by cores of a CBB (e.g., core(s) 114 of CBB 102) to a plurality of class of service (CLOS). An example of a technology to allocate LLC or L3 cache to a plurality of CLOS can include, but is not limited to, Intel® Cache Allocation Technology (CAT) that is part of a larger series of technologies called Intel® Resource Director Technology (RDT). As shown in FIG. 3, 16 CLOSs are shown having a 4-bit binary value of "0" to "15" to represent an example of 16 CLOSs that are each allocated to a portion of LLC or L3 cache that is arranged to receive data from an I/O agent into the LLC or L3 cache for processing by core(s) of the CBB. As shown in FIG. 3 for CAT mask table 300, each 4-bit binary value indicates a respective IO RDT CLOS identifier (ID).

According to some examples, a BIOS of a system (e.g., BIOS 101 of system 100) can configure a CAT mask table such as CAT mask table 300 to map each 4-bit binary value for a respective IO RDT CLOS ID to a 2-bit binary value for a respective IO$ partition ID of an IO$ such as IO$ 130 to generate a 6-bit IO CLOS value. A configured CAT mask table 300, can be included in a data structure maintained by I/O stack logic at an intermediate I/O cache die such as I/O stack logic 145 at intermediate I/O cache die(s) 148. Alternatively, the BIOS may set or program one or more registers at the intermediate I/O cache die such as register(s) included in CSR 147. The set or programmed register(s) of CSR 147 may then be accessible by I/O stack logic 145 to access the configured CAT mask table 300. For these examples, the IO$ partition IDs shown in FIG. 3 have a 2-bit binary value corresponding to partitions P0 to P3. As shown in FIG. 2 and mentioned above, P0 to P3 can represent portions of an IO$ (e.g., IO$ 130) that may be allocated to a type of traffic source from which inbound data is to be received in the IO$ for eventual processing by core(s) included in a disaggregated die SoC. In operation, CAT mask table 300 can allow for a desired or proper allocation of incoming data to the various caches include in a cache hierarchy of the disaggregated die SoC based on a traffic source for the data and based on assigned IO RDT CLOS IDs. In some examples, the BIOS may be programmed to configure a CAT mask table such as CAT mask table 300 based on deployment scenarios for the disaggregated die SoC that may include various types of server usages, e.g., for different networking workloads.

FIG. 4 illustrates an example CBB ID table 400. In some examples, CBB ID table 400 may be programmed by an OS of a system such as OS 103 of system 100 following generation of a CAT mask table such as CAT mask table 300 shown in FIG. 3. For these examples, the CAT mask table may be made visible or available to the OS to map IO CLOS values to resource monitoring IDs (RMIDs) assigned to applications to be executed or supported by cores of a CBB that have allocated cache lines in a CBB shared cache (e.g., CBB shared cache 118) to receive data from I/O agents. The RMIDs to be assigned, for example, in accordance with Intel® RDT. If CBB ID table 400 includes an RMID in the CBB ID column of example CBB ID table 400, the assigned RMID is used as the CBB ID for the allocated cache line in the CBB shared cache. In other words, an RMID programmed in the CBB ID column indicates a preloaded address in the CBB shared cache that is allocated to receive data from the I/O agents. As described more below, CBB ID table 400 may be utilized to determine whether cache ownership requests received from I/O agents are associated with allocated/preloaded addresses for a cache line of a CBB shared cache.

Figure 5:
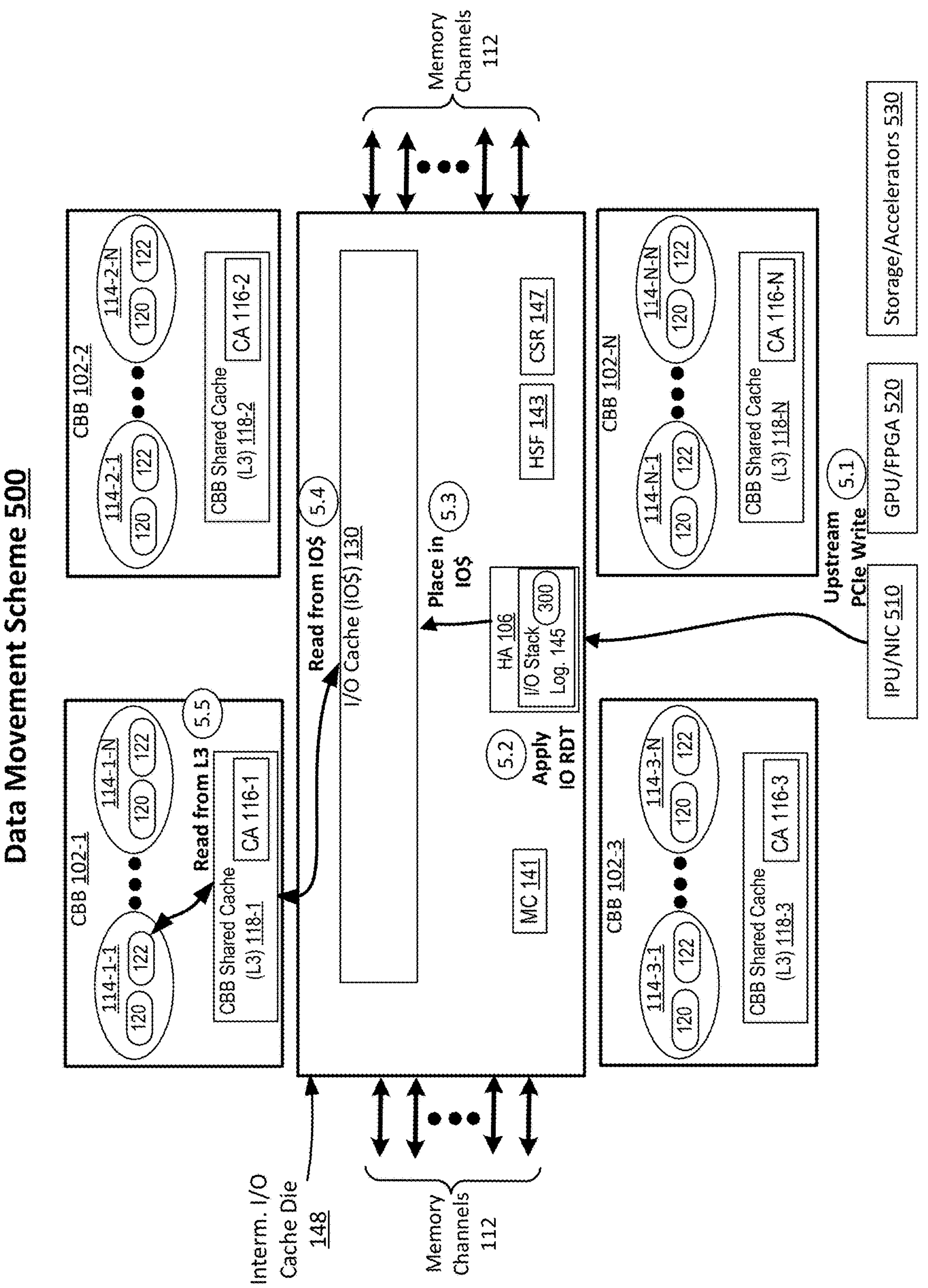
FIG. 5 illustrates example data movement scheme.

FIG. 5 illustrates an example data movement scheme 500. According to some examples, data movement scheme 500 shows a simplified example of movement of data from an I/O device that is shown in FIG. 5 as infrastructure processing unit (IPU)/NIC 510 through IO$ 130 to eventually reach a core of a CBB for processing. In other examples, a similar data movement can occur for the other I/O devices shown in FIG. 5 as GPU/FPGA 520 or storage/accelerators 530. This simplified example relates to a DDIO mode that is to be later described as an IO$ allocation DDIO mode. For these examples, IPU/NIC 510, GPU/FPGA 520 or storage/accelerators 530 may be located on a same or different die from among I/O die(s) 146 and may separately represent types of I/O agents from among I/O agent(s) 128 as mentioned above and shown in FIG. 1. IPU/NIC 510, GPU/FPGA 520 or storage/accelerators 530 can be traffic sources for data destined for one or more cores of a CBB from among CBBs 102-1 to 102-N, where "N" represents any whole positive integer greater than 1. Each core 114-1 to 114-N of a respective CBB 102 may use a CBB shared cache (L3) 118 to receive data routed through IO$ 130. CBBs 102-1 to 102-N, for example, can be located on separate compute dies included in compute die(s) 144.

In some examples, at 5.1, IPU/NIC 510 generates an upstream PCIe write. For these examples, the upstream PCIe write may be targeted to a core included in CBB 102-1 such as core 114-1-1. Although not shown in FIG. 5, the upstream PCIe write, for example may be routed via a die-to-die or chip-to-chip communication links routed through an interconnect network such as communication links routed through interconnect network 110 to logic and/or features of HA 106 at intermediate I/O cache die 148 (e.g., I/O stack logic 145).

According to some examples, at 5.2, I/O logic and/or features of HA 106 such as stack logic 145 may utilize a CAT mask table such as example CAT mask table 300 that applies IO RDT to determine where to place the data associated with the upstream PCIe write in IO$ 130 or may utilize an I/O cache allocation scheme such as I/O cache allocation 200 shown in FIG. 2 to determine where to place the data. For example, if I/O cache allocation 200 is used, IPU/NIC 510 may be a data traffic source type that has been allocated partition ID P0 (00) of IO$ 130 according to I/O cache allocation 200.

In some examples, at 5.3, logic and/or features of HA 106 such as I/O stack logic 145 causes the data associated with the upstream PCIe write sent from IPU/NIC 510 to be stored to partition ID P0 of IO$ 130 based on the determination made by I/O stack logic 145 at 5.2.

According to some examples, at 5.4, HA 106 at intermediate I/O cache die 148 can be arranged to cause CBB caching agent 116-1 to read from partition P0 of IO$ 130 to pull the data associated with the upstream PCIe write sent from IPU/NIC 410 to CBB shared cache 118-1. The data pulled from IO$ 130 is routed via a die-to-die or chip-to-chip communication links routed through an interconnect network such as communication links routed through interconnect network 110.

In some examples, at 5.5, CBB caching agent 116-1 notifies core 114-1-1 that the data associated with the upstream PCIe write sent form IPU/NIC 510 destined for processing by core 114-1-1 has been placed into CBB shared cache 118-1. Core 114-1-1 may then read the data from CBB shared cache 118-1 and place the data in its core cache hierarchy 122 for eventual processing of the data. Data movement scheme 500 then comes to an end.

Figure 6:
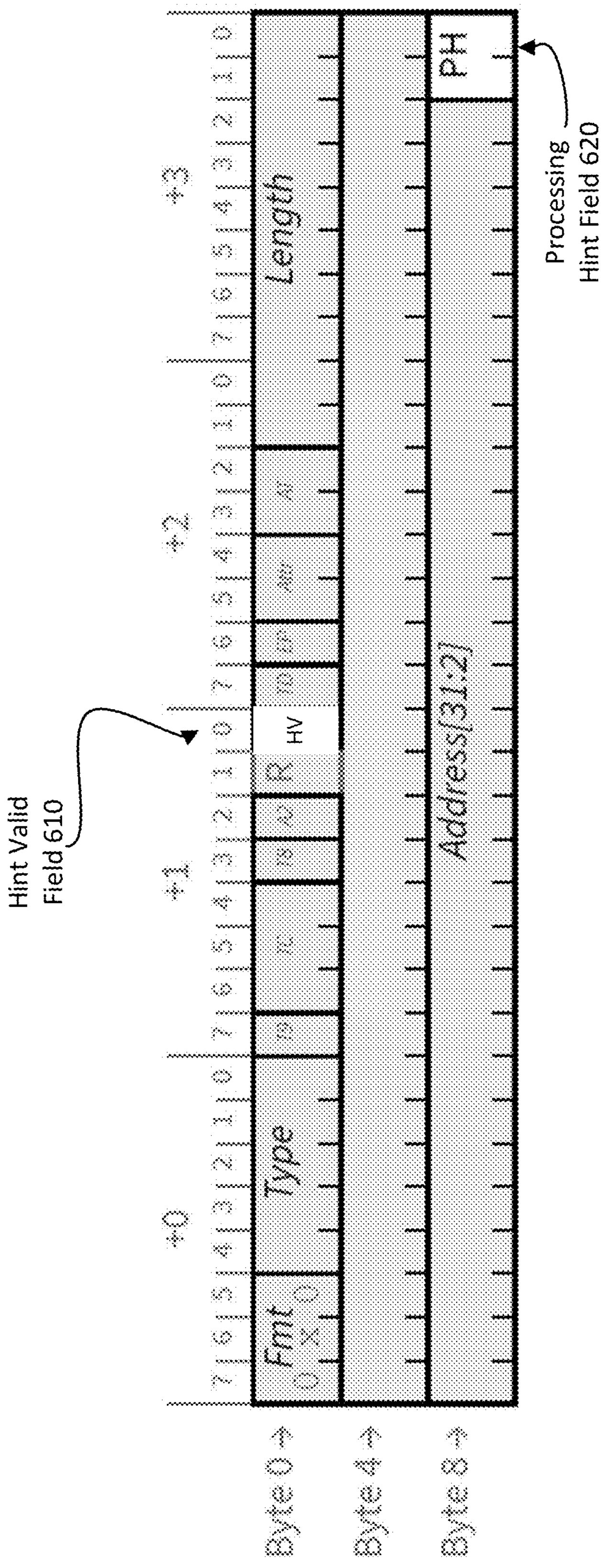
FIG. 6 illustrates an example transaction layer packet (TLP) format.

FIG. 6 illustrates an example TLP format 600. According to some examples, TLP format 600 can based on a PCIe TLP for a memory write request in accordance with the PCIe specification. For these examples, the PCIe TLP for the memory write request in the example TLP format 600 can be generated by an I/O agent at an I/O die in a disaggregated SoC such as I/O agent(s) 128 at an I/O die from among I/O die(s) 148 of system 100 as shown in FIG. 1. Example TLP format 600 shown in FIG. 6 is for a 12 byte TLP, examples are not limited to a 12 byte TLP. As described more below, a hint valid (HV) field 610 and a processing hint (PH) field 620 may include information to indicate what DDIO mode is to be used to move data associated with the memory write request first to an IO$ at an intermediate I/O cache die and then to a cache hierarchy for a CBB at a compute die. In some examples, bits asserted/not asserted in hint valid field 610 and processing hint field 620 are collectively referred to as a TLP processing hint (TPH) bits.

FIG. 7 illustrates an example DDIO mode table 700. In some examples, as shown in FIG. 7, DDIO mode table 700 shows a dynamic allocation, a core$ allocation, an IO$ allocation, and a non-allocating DDIO mode to depict behavior and usage scenarios for when a DDIO mode is activated according to hints and/or static configurations.

In some examples, as shown in FIG. 7 for DDIO mode table 700, a first example DDIO mode is dynamic allocation. In dynamic allocation, data produced by an I/O agent or device is written to an LLC of a core of a CBB resident on a compute die based on a behavior that determines whether an address is already preloaded in the LLC/L3 cache of the core. An address is already resident based on the preloading of the address in the LLC/L3 cache that is also resident on the compute die. An example of this preloading is described in more detail below. If an address is preloaded, DDIO mode table 700 indicates a behavior that includes allocating a cache line to the CBB LLC/L3 cache (e.g., CBB shared cache 118) arranged to receive data from an I/O agent. The allocated cache line, for example, can be assigned to a given CLOS for the CBB LLC/L3 cache. If an address is not already preloaded, then a cache line of IO$ cache resident at an intermediate I/O cache die (e.g., IO$ 130) can be allocated to receive data from the I/O agent and that data may then be pulled from the IO$ by the core resident on the CBB die (e.g., similar to what was described above for data movement scheme 500).

Also, as shown in FIG. 7 for DDIO mode table 700, core$ allocation is a second example DDIO mode. For this second example, core$ allocation includes a behavior of allocating a cache line in an LLC/L3 cache for a core of a CBB resident on a compute die based on a static information. A core of the CBB resident on the compute die doesn't explicitly preload or prefetch an address in the LLC/L3 cache for the core. Rather, a CBB ID is determined for caching data received from an I/O agent based on the static information. The static information, for example, can be based on a predetermined affinity between the core and the I/O agent generating the data to be processed by the core. The predetermined affinity may be determined or established by a BIOS for a multi-die, disaggregated system (e.g., BIOS 101 of system 100) during configuration or initiation of the multi-die, disaggregated computing system.

Also, as shown in FIG. 7 for DDIO mode table 700, IO$ allocation is a third example DDIO mode. For this third example, IO$ allocation includes a behavior of allocating a cache line of IO$ resident at an intermediate I/O cache die (e.g., IO$ 130) to receive data from an I/O agent to eventually be pulled from the allocated cache line of the IO$ by a core of a CBB resident on a compute die.

Also, as shown in FIG. 7 for DDIO mode table 700, non-allocating is a fourth example DDIO mode. For this fourth example, non-allocating is essentially an off mode for DDIO. A non-allocating DDIO mode can cause data to be processed by a core of a CBB to be pulled out of internal caches rather than being written to allocated cache lines in an MLC/LLC resident on a CBB die or first written to an IO$ cache resident at an intermediate I/O cache die. A non-allocating DDIO mode can also cause data to be written to memory at a memory die (e.g., memory 108) if the data is not available to be pulled from internal caches.

In some examples, TPH bits for HV and PH of a TLP request packet in the example format of TLP format 600 may be set to indicate a possible selection of DDIO modes on a dynamic or static basis. As shown in FIG. 7 for DDIO mode table 700, TLP processing hint (TPH) bits may be set to indicate whether DDIO modes are to be selected dynamically. For example, if the HV bit in HV field 610 of TLP format 600 is set to a 1-bit value of 1 (e.g., HV=1'b1), then DDIO modes are to be dynamically selected. However, if the HV bit in HV field 610 is set to a 1-bit value of 0 (e.g., HV=1'b0), the DDIO modes are static BIOS configured DDIO modes and the 2-bit value in PH field 620 is not applicable. Also, if dynamic basis is indicated in the TLP packet, PH bits included in PH field 620 of TLP format 600 set to a 2-bit value of 10 (e.g., PH=2'b10) indicate a non-allocating mode, and a 2-bit value of 01 (e.g., PH2'b01) indicate one of a dynamic, core$ or IO$ allocation DDIO mode can be used.

According to some examples, dynamic allocation DDIO mode can be selected in various usage scenarios as shown in FIG. 7 for DDIO mode table 700. For example, dynamic allocation DDIO mode may be selected in usage scenarios associated with scheduling data plane applications for a 5G user plane function (5G UPF) or applications for use with a data plane development kit (DPDK) to accelerate packet processing of a workload on one or more cores resident on a compute die. Core$ allocation DDIO mode may be selected based on use of applications not tuned for use with DPDK. IO$ allocation DDIO mode may be selected based on usage scenarios in which there is a high level of hardware abstraction and it can be difficult to create a specific affinity for a core caching hierarchy between an I/O agent and one or more cores of a CPU (e.g., cloud native migration, sharing) or if accelerators are part of an I/O caching hierarchy. Non-allocating DDIO mode may be selected for debugging or baseline performance determination. A determined baseline performance may be used to measure effectiveness of the various DDIO modes to facilitate selection of a DDIO mode that has the greatest positive/beneficial impact on performance for a multi-die, disaggregated system.

Figure 8:
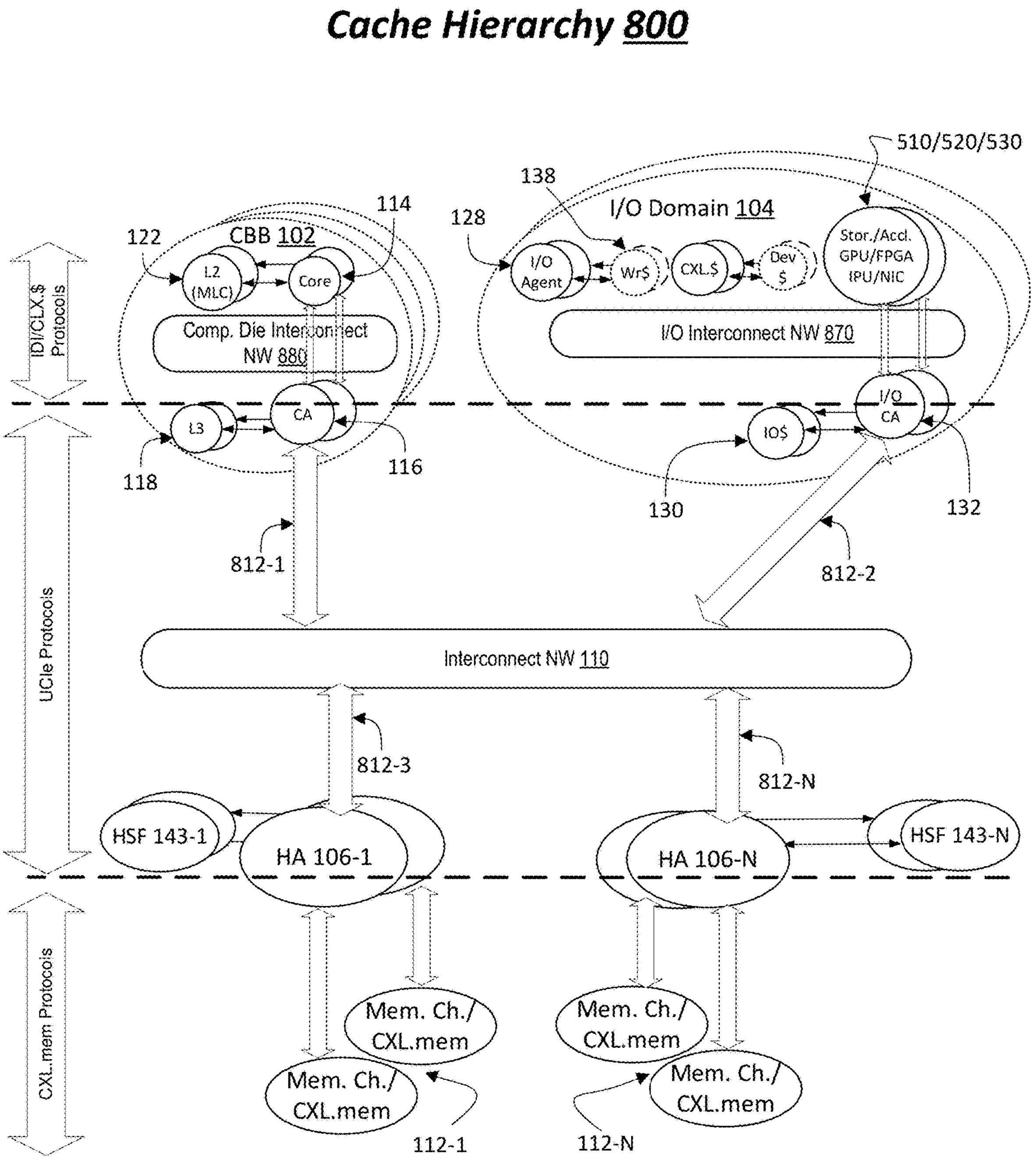
FIG. 8 illustrates an example cache hierarchy.

FIG. 8 illustrates an example cache hierarchy 800. In some examples, cache hierarchy 800 provides a cache hierarchy view of the various elements of system 100 to depict the various different protocols used in system 100 that can be associated with implementing a selected DDIO mode. For example, starting with IDI/CXL.$ protocols, cores 114 of CBB 102 may communicate with CA 116 via a compute die interconnect network 880 using IDI and/or CXL.$/CXL.cache protocols to coordinate a push or a pull of data into CBB shared cache 118 (L3). Also, an I/O agent 128 of I/O domain 104 resident on an I/O die 146 may communicate with I/O CA 132 via an I/O interconnect network 870 using IDI and/or CXL.$/CXL.cache protocols to coordinate a flow of data with I/O CA 132 from an internal cache for I/O agent 128 shown in FIG. 8 as Wr$ 138 to IO$ 130.

According to some examples, CBB shared cache 118 at CBB 102 and IO$ 130 are depicted as being below a dashed line between the arrow for IDI/CXL.$ protocols and the UCIe protocols to indicate that data flowing into IO$ 130 from I/O agent 128 and then into CBB shared cache 118 may both be routed through interconnect network 110 via communication links such as communication links 812-1 and 812-2. Also, CA 116 at CBB 102 and I/O CA at I/O domain 104 may communicate with HAs 106-1 to 106-N through interconnect network 110 via at least one of communication links 812-1 to 812-N. As shown in FIG. 8, interconnect network 110 and communication links 812-1 to 812-N are configured to use UCIe protocols for these examples of chip-to-chip or die-to-die communications. Although, examples are not limited to UCIe protocols. Also, CA 116 of CBB 102 and I/O CA 132 of I/O domain 104 are shown in FIG. 8 as straddling the dashed line between the arrow for IDI/CXL.$ protocols and the UCIe protocols to indicate that CA 116 and I/O CA 132 may facilitate a data flow using both types of protocols.

As described below for various data flows, HAs 106-1 to 106-N and HSFs 143-1 to 143-N resident on intermediate I/O cache die(s) 148 can be arranged to facilitate use of IO$ 130 or CBB shared cache (L3) 118 based on a selected DDIO mode. HAs 106-1 to 106-N and HSF 143-1 to 143-N can be arranged to communicate to CA 116 or I/O CA 132 through interconnect network 110 via data links 812-3 and 812-4 according to the selected DDIO mode, be it a dynamically selected DDIO mode or a statically configured DDIO mode.

Similar to CA 116 and I/O CA 132, as shown in FIG. 8, HAs 106-1 to 106-N straddle a dashed line between protocol arrows. In this case, HAs 106-1 to 106-N straddle a dash line between an arrow for UCIe protocols and an arrow for CXL.mem protocols to indicate that HAs 106-1 to 106-N can be arranged to communicate to CA 116 and I/O CA 132 using UCIe protocols and also arranged to communicate to memory 108 resident on memory die(s) 150 (not shown in FIG. 8) via memory channels 112-1 to 112-N using CXL.mem protocols. HAs 106-1 to 106-N, if a selected DDIO mode is a non-allocating mode as mentioned above for FIG. 6, can be arranged to write data to memory 108 using CXL.mem protocols via memory channels 112-1 to 112-N. Although, examples are not limited to CXL.mem protocols to write data to memory 108.

Figure 9:
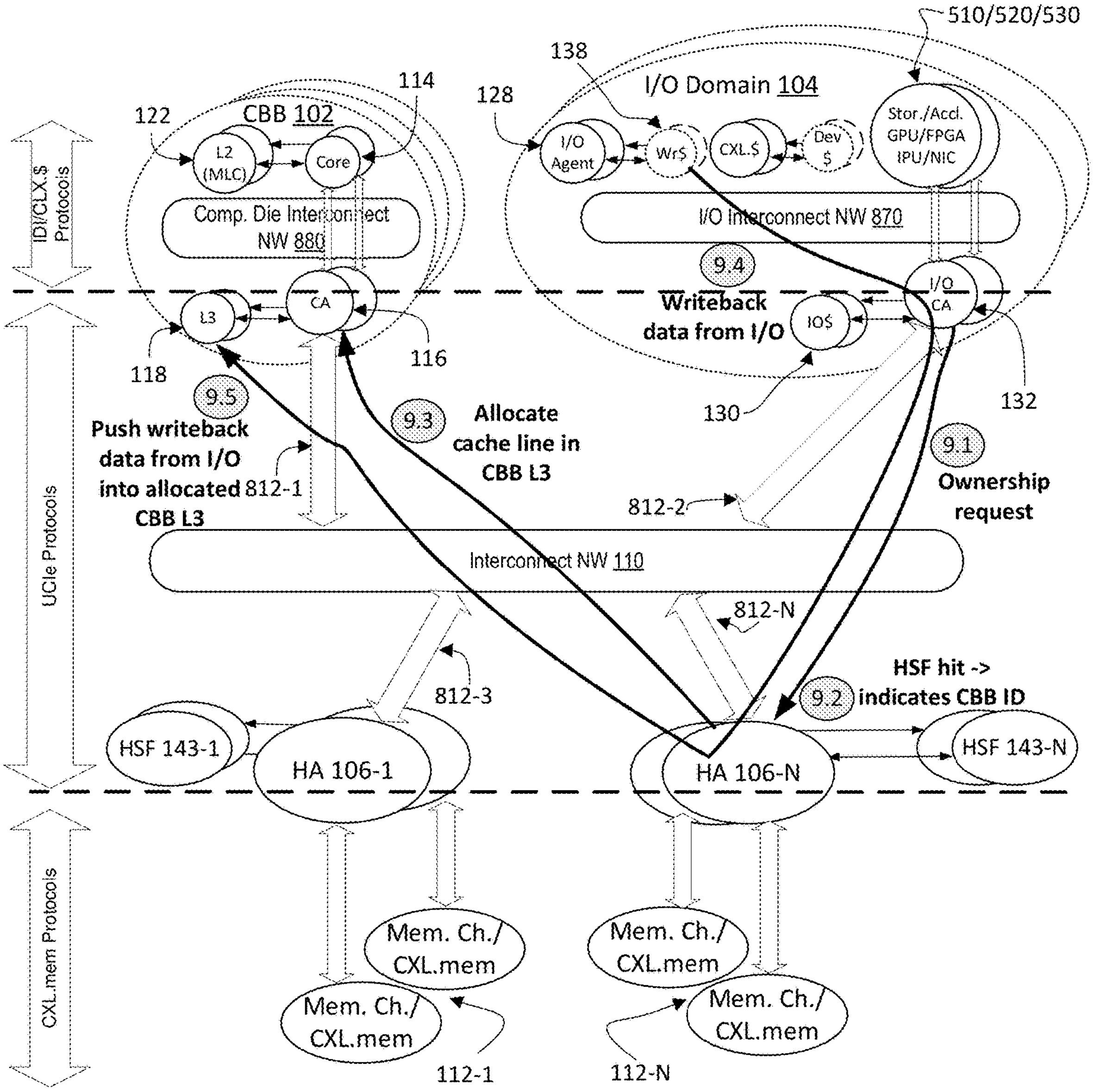
FIG. 9 illustrates a first data flow for the cache hierarchy based on a first DDIO mode.

FIG. 9 illustrates an example data flow 900. According to some examples, data flow 900 is based on selection of a dynamic allocation DDIO mode. For these examples, at 9.1, I/O CA 132 places an ownership request to allocate a cache line in CBB shared cache (L3) 118 to receive data from I/O agent 128 that is currently maintained in Wr$ 138. The ownership request can be initiated using a TLP request packet in the example format of TLP format 600. The ownership request also includes a 4-bit IO RDT CLOS ID associated with the cache line in CBB shared cache (L3) 118 (e.g., in a reserved field of a PCIe request header for the TLP request packet). The 4-bit IO RDT CLOS ID, for example, can be based on a preconfigured affinity between I/O agent 128 and core 114/L3 118 (e.g., preconfigured at system 100 configuration). The preconfigured affinity is known by CA 132 (e.g., established at system configuration) and is the basis for determining what 4-bit IO RDT CLOS ID (e.g., 0000) is to be include in the ownership request. Consistent with a dynamic allocation DDIO mode being selected, the 1-bit value in HV field 610 is set to a value of 1 and the 2-bit value in PH field 620 is set to a value of 01. The ownership request, as shown in FIG. 9, is routed to HA 106-N through interconnect network 110 via communication links 812-2 and 812-N utilizing, for example, UCIe protocols.

According to some examples, at 9.2, logic and/or features of HA 106-N (e.g., I/O stack logic 145) utilizes CAT mask table 300 to identify an IO CLOS value based on the IO RDT CLOS ID (e.g., 0000) received with the ownership request. For these examples, HA 106-N forwards the identified IO CLOS value to HSF 143-N. HSF 143-N utilizes CBB ID table 400 to determine that a CBB ID hit exits for the identified IO CLOS value. For example, the identified IO CLOS value is 000000 and an RMID for application 0 is included in CBB ID table 400 that corresponds to or maps to an IO CLOS value of 000000 as shown in FIG. 4. The RMID for application 0 that maps to the identified IO CLOS value of 000000 is then provided to HA 106-N to indicate an HSF hit and to provide the RMID for application 0 to use as a CBB ID. Although not shown in FIG. 9, if a CBB ID hit does not exist (CBB ID miss), HSF 143-N notifies HA 106-N of this CBB ID miss and a cache line of IO$ 130 associated with IO CLOS value 000000 can be allocated to receive writeback data from I/O agent 128 and that data may then be pulled from IO$ 130 by CA 116 for processing by core 114 (e.g., in a similar manner as to what was described above for data movement scheme 500).

In some examples, at 9.3, logic and/or features of HA 106-N communicate with CA 116 through interconnect network 110 via communication links 812-1 and 812-N utilizing UCIe protocols to allocate a cache line in CBB shared cache (L3) 118. For these examples, the cache line to allocate is associated with the CBB ID (RMID for application 0) as determined by the HSF hit.

According to some examples, at 9.4, I/O CA 132 causes writeback data from Wr$ 138 to be sent to HA 106-N through interconnect network 110 via communication links 812-2 and 812-N, for example, utilizing UCIe protocols.

In some examples, at 9.5, logic and/or features of HA 106-N cause the writeback data from Wr$ 138 to be pushed to a cache line address in CBB shared cache (L3) 118 associated with the identified CBB ID. For these examples, the writeback data from Wr$ 138 can be routed through interconnect network 110 via communication links 812-N and 812-1 utilizing UCIe protocols. Data flow 900 then comes to an end.

Figure 10:
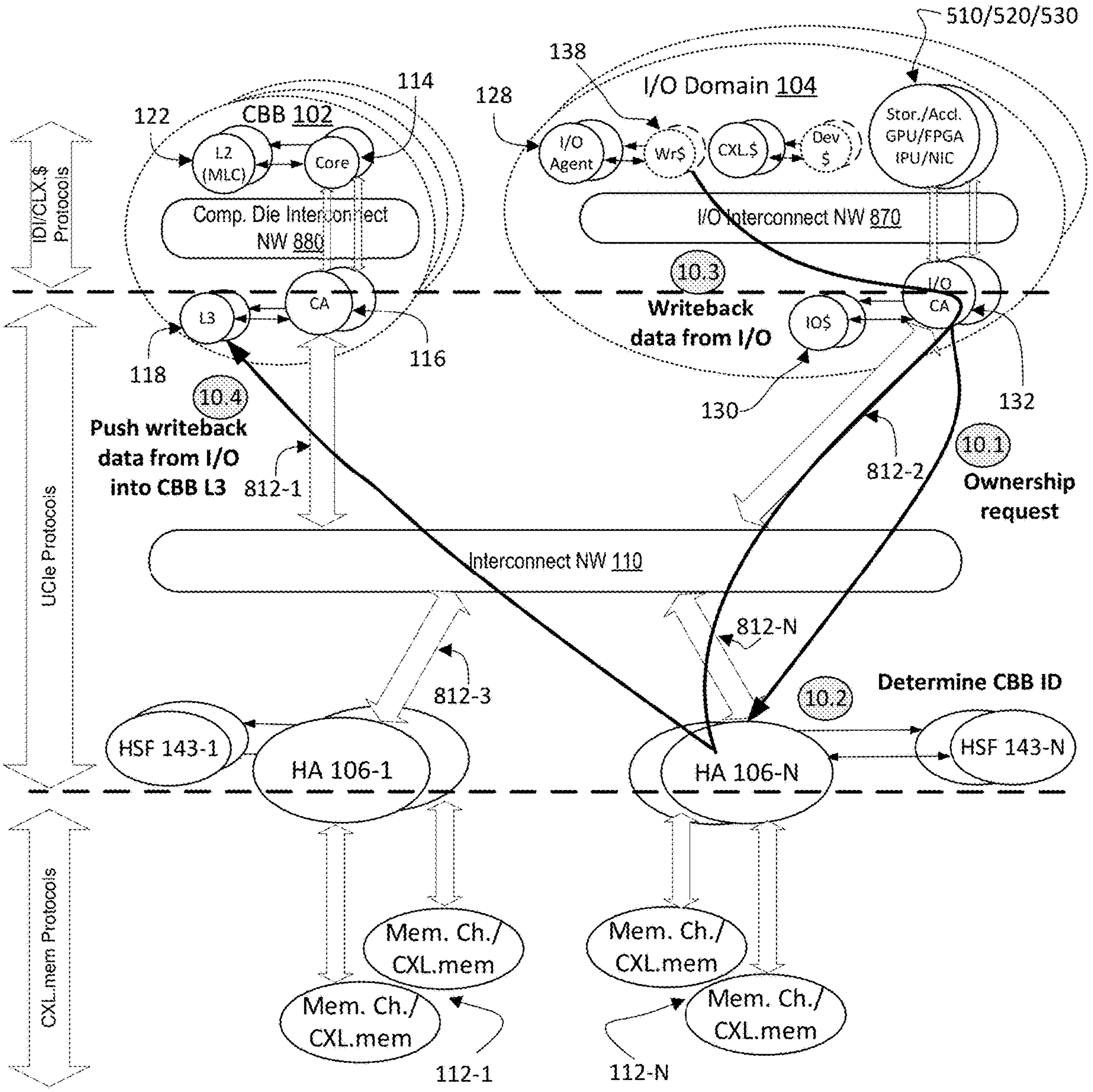
FIG. 10 illustrates a second data flow for the cache hierarchy based on a second DDIO mode.

FIG. 10 illustrates an example data flow 1000. According to some examples, data flow 1000 is based on selection of a core$ allocation DDIO mode. For these examples, at 10.1, I/O CA 132 places an ownership request to allocate a cache line in CBB shared cache (L3) 118 to receive data from I/O agent 128 that is currently maintained in Wr$ 138. The ownership request can be initiated using a TLP request packet in the example format of TLP format 600. The ownership request also includes a 4-bit IO RDT CLOS ID associated with the cache line in CBB shared cache (L3) 118 (e.g., in a reserved field of a PCIe request header for the TLP request packet). The 4-bit IO RDT CLOS ID, for example, can be based on a preconfigured affinity between I/O agent 128 and core 114/L3 118 (e.g., preconfigured at system 100 configuration). The preconfigured affinity is known by CA 132 and is the basis for determining what 4-bit IO RDT CLOS ID to include in the ownership request. Consistent with a core$ allocation DDIO mode being selected, the 1-bit value in HV field 610 is set to a value of 1 and the 2-bit value in PH field 620 is set to a value of 01. The ownership request, as shown in FIG. 10 is routed to HA 106-N through interconnect network 110 via communication links 812-2 and 812-N utilizing, for example, UCIe protocols.

According to some examples, at 10.2, logic and/or features of HA 106-N (e.g., I/O stack logic 145) utilizes CAT mask table 300 to identify an IO CLOS value based on the IO RDT CLOS ID received with the ownership request. Rather than having HSF 143-N use a CBB ID table such as CBB ID table 400 to look for a CBB ID as described above for data flow 900, the identified IO CLOS value is used by logic and/or features of HA 106-N based on static information to determine a CBB ID. The static information, for example, can be based on a predetermined affinity between a core and the I/O agent generating the data to be processed by the core as mentioned above for the description of the core$ allocation DDIO mode in DDIO mode table 700. The static information, for example, can be determined by BIOS 101 or OS 103 during initialization of system 100 and that static information is provided to HA 106-N (e.g., via setting or programing register(s) of CSR 147 or populating a data structure accessible to HA 106-N). Once a CBB ID is identified, the ownership request is granted by HA 106-N.

According to some examples, at 10.3, I/O CA 132 causes writeback data from Wr$ 138 to be sent to HA 106-N through interconnect network 110 via communication links 812-2 and 812-N, for example, utilizing UCIe protocols.

In some examples, at 10.4, logic and/or features of HA 106-N cause the writeback data from Wr$ 138 to be pushed to a cache line address in CBB shared cache (L3) 118 associated with the identified CBB ID for which ownership was granted to I/O CA 132. For these examples, the writeback data from Wr$ 138 can be routed through interconnect network 110 via communication links 812-N and 812-1 utilizing UCIe protocols. Data flow 1000 then comes to an end.

Figure 11:
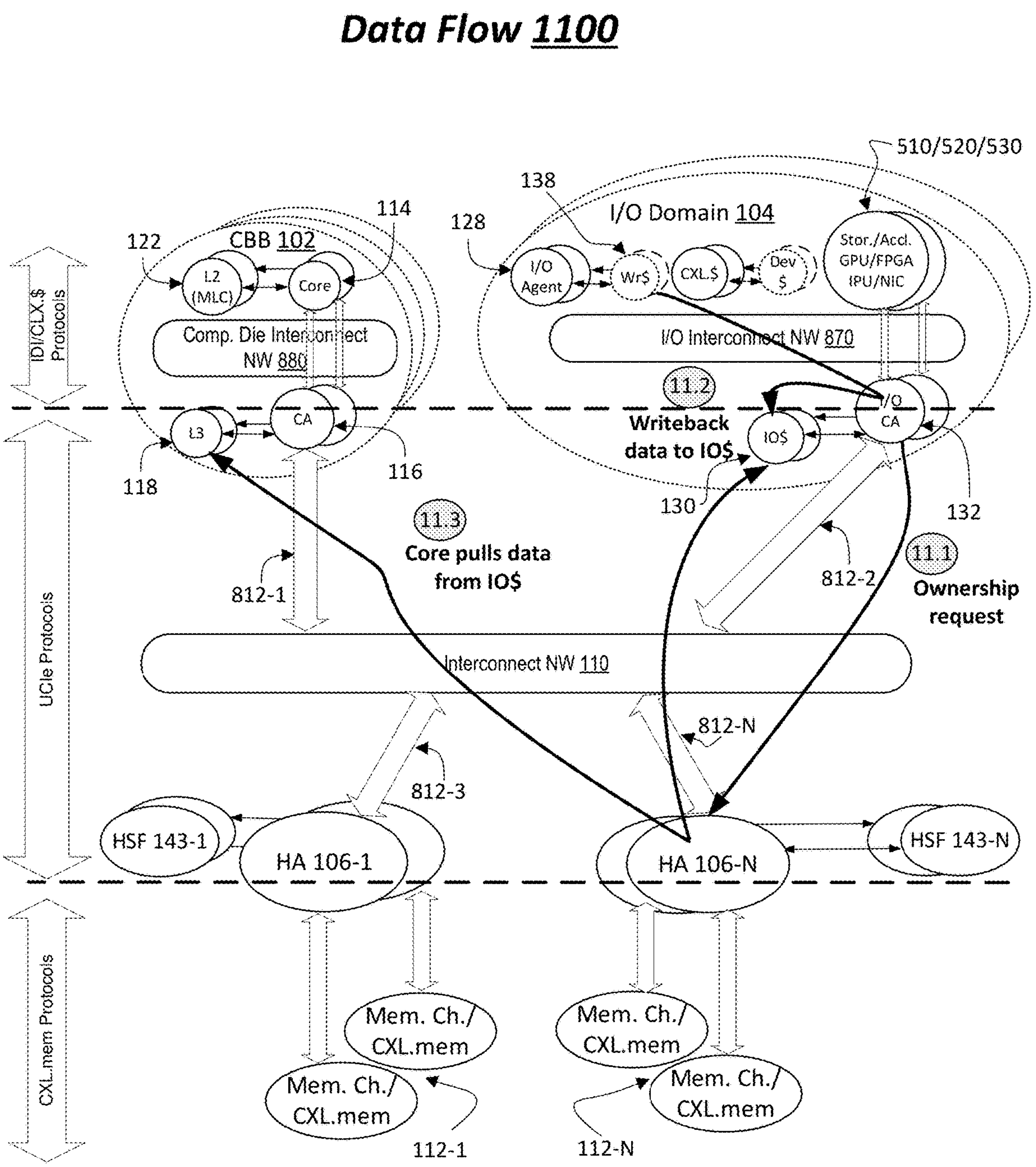
FIG. 11 illustrates a third data flow for the cache hierarchy based on a third DDIO mode.

FIG. 11 illustrates an example data flow 1100. According to some examples, data flow 1100 is based on selection of an IO$ allocation DDIO mode. For these examples, at 11.1, I/O CA 132 places an ownership request to allocate a cache line in IO$ 130 to receive data from I/O agent 128 that is currently maintained in Wr$ 138. The ownership request can be initiated using a TLP request packet in the example format of TLP format 600. Consistent with an IO$ allocation DDIO mode being selected, the 1-bit value in HV field 610 is set to a value of 1 and the 2-bit value in PH field 620 is set to a value of 01. The ownership request, as shown in FIG. 11 is routed to HA 106-N through interconnect network 110 via communication links 812-2 and 812-N utilizing, for example, UCIe protocols. Since an IO$ allocation DDIO mode is used when there is a high level of hardware abstraction (e.g., little to no affinity between I/O agent 128 and core 114/L3 118), an IO RDT CLOS ID is likely not known by I/O CA 132. So for IO$ allocation DDIO mode, an IO RDT CLOS ID is not included in the ownership request.

According to some examples, at 11.2, logic and/or features of HA 106-N (e.g., I/O stack logic 145) identifies the IO$ partition ID based on I/O cache allocation 200 that allocates IO$ 130 based on a data traffic source type (e.g., see data traffic source types in FIG. 2 for I/O cache allocation 200). For these examples, HA 106-N then allocates a cache line to IO$ 130 included in the identified IO$ partition ID to grant the ownership request to I/O CA 132. HA 106-N sends a notification to I/O CA 132 that ownership has been granted to the cache line to IO$ 130. The notification to include a cache address for the cache line included in the identified IO$ partition ID. The notification to be routed to I/O CA 132 through interconnect network 110 via communication links 812-N and 812-2 utilizing, for example, UCIe protocols. I/O CA 132 then causes I/O agent 128 to writeback data from Wr$ 138 to the cache line address included in the notification. Although FIG. 11 indicates that IO$ 130 is part of I/O domain 104, IO$ 130, in some examples, is not resident on a same die or chip as I/O CA 132 and/or I/O agent 128, but is resident on a same die or chip as HA 106-N (see FIG. 1 and FIG. 5). Therefore, I/O CA 132 is to utilize UCIe protocols to route the writeback data through interconnect network 110 to the cache address for the cache line included in the identified IO$ partition ID of IO$ 130. Communication links 812-2 and 812-N can be used to route the writeback data through interconnect network 110.

In some examples, at 11.3, HA 106 also sends a notification to CA 116 at CBB 102 to indicate that cache line ownership has been granted for I/O agent 128 to writeback data to IO$ 130. The notification to include the cache address for the cache line included in the identified IO$ partition ID that was also provide to I/O CA 132. For these examples, CA 116 causes core 114 to pull writeback data placed at the cache address by I/O agent 128 from IO$ 130. The writeback data may be pulled utilizing UCIe protocols. As mentioned above, IO$ 130 can be located on a same die or chip as HA 106-N, so communication links 812-N and 812-1 can be used to pull the writeback data from IO$ 130 to at least CBB shared cache (L3) 118 at CBB 102. Data flow 1100 then comes to an end.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware examples, a logic flow may be implemented by computer executable instructions stored on at least one non-transitory computer readable medium or machine readable medium, such as an optical, magnetic or semiconductor storage. The examples are not limited in this context.

Figure 12:
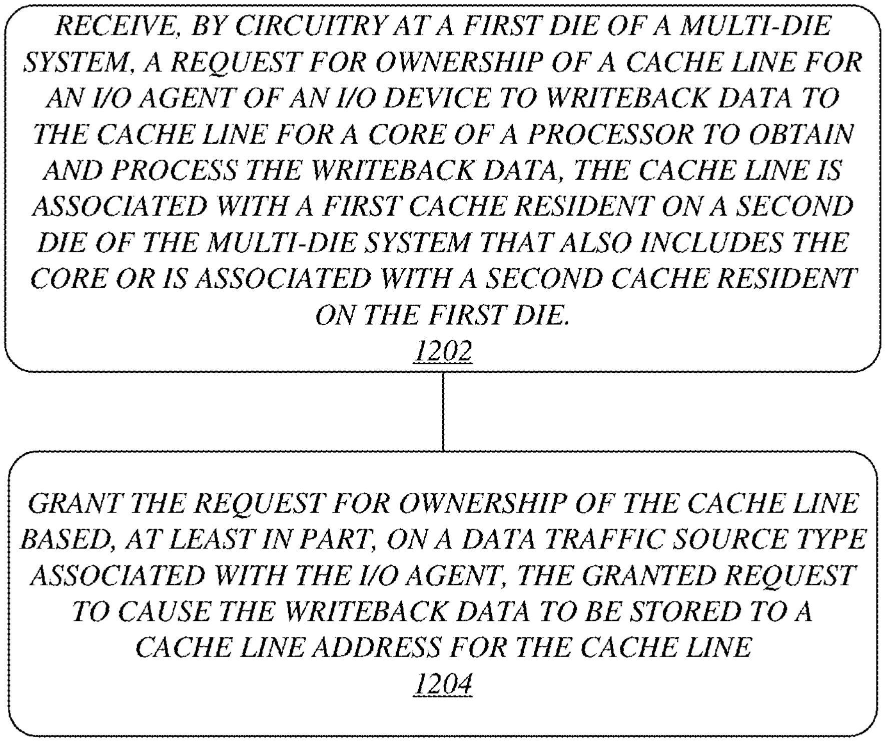
FIG. 12 illustrates an example logic flow.

FIG. 12 illustrates an example logic flow 1200. Logic flow 1200 may be an example of receiving and granting request to move data to a cache in a multi-die system. According to some examples, logic flow 1200 can be performed by circuitry at first die such as circuitry to implement logic and/or features of HA 106 resident on an intermediate I/O cache die from among intermediate I/O cache die(s) 148 as shown in FIGS. 1, 5 and 8-11. Examples are not limited to the circuitry to implement logic and/or features of an HA such as HA 106.

In some examples, as shown in FIG. 12, logic flow 1200 at block 1202 may receive, by circuitry at a first die of a multi-die system, a request for ownership of a cache line for an I/O agent of an I/O device to writeback data to the cache line for a core of a processor to obtain and process the writeback data. The cache line is associated with a first cache resident on a second die of the multi-die system that also includes the core or is associated with a second cache resident on the first die. For these examples, logic and/or features of HA 106 can be the circuitry at the first die to receive the request to move the data to a first cache located on the intermediate I/O cache die (e.g., IO$ 130) or to a second cache located on a second die. The second die, for example, is a compute die from among compute die(s) 144 and the second cache is an L3 cache such as CBB shared cache 118 to be shared by core(s) 114. The request can be received from an I/O agent for an I/O device resident on a third die. For example, an I/O agent from among I/O agent(s) 128 for I/O device(s) 126 resident on an I/O die from among I/O die(s) 146.

According to some examples, logic flow 1200 at 1204 may grant the request for ownership of the cache line based, at least in part, on a data traffic source type associated with the I/O agent, the granted request to cause the writeback data to be stored to a cache line address for the cache line. For these examples, logic and/or features of HA 106 can grant the request based, at least in part, on a data traffic source type associated with the I/O agent. For example, the data traffic source type can be an IOMMU, an accelerator, an IPU/NIC, or a CXL type 1 or type 2 device.

While various examples described herein could use System-on-a-Chip or System-on-Chip ("SoC") to describe a device or system having a processor and associated circuitry (e.g., Input/Output ("I/O") circuitry, power delivery circuitry, memory circuitry, etc.) integrated monolithically into a single integrated circuit ("IC") die, or chip, the present disclosure is not limited in that respect. For example, in various examples of the present disclosure, a device or system could have one or more processors (e.g., one or more processor cores) and associated circuitry (e.g., I/O circuitry, power delivery circuitry, etc.) arranged in a disaggregated collection of discrete dies, tiles and/or chiplets (e.g., one or more discrete processor core die arranged adjacent to one or more other die such as memory die, I/O die, etc.). In such disaggregated devices and systems the various dies, tiles and/or chiplets could be physically and electrically coupled together by a package structure including, for example, various packaging substrates, interposers, interconnect bridges and the like. Also, these disaggregated devices can be referred to as a system-on-a-package (SoP).

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, various examples also include non-transitory, tangible machine-readable media containing instructions or containing design data, such as Hardware Description Language (HDL), which defines structures, circuits, apparatuses, processors and/or system features described herein. Such examples may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof.

Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1. An example apparatus can include a first die arranged to be included in a multi-die system and circuitry. The circuitry can receive a request for ownership of a cache line for an I/O agent of an I/O device to writeback data to the cache line for a core of a processor to obtain and process the writeback data. The cache line can be associated with a first cache resident on a second die of the multi-die system that also includes the core or is associated with a second cache resident on the first die. The circuitry can also grant the request for ownership of the cache line based, at least in part, on a data traffic source type associated with the I/O agent, the granted request to cause the writeback data to be stored to a cache line address for the cache line.

Example 2. The apparatus of example 1, the first cache resident on the second die can include an L3 cache shared by the core with other cores of the processor.

Example 3. The apparatus of example 1, the I/O agent and I/O device can be resident on a third die of the multi-die system.

Example 4. The apparatus of example 3, the circuitry can be communicatively coupled to the I/O agent resident on the third die via a chip-to-chip interconnect network arranged to operate according to the UCIe specification.

Example 5. The apparatus of example 1, the request for ownership can be received via a PCIe TLP request, the PCIe request TLP to include information to indicate the request for ownership is to the first cache resident on the second die.

Example 6. The apparatus of example 5, the information to indicate the request for ownership is to the first cache can be a CLOS ID for the first cache. The CLOS ID can be associated with the cache line address to store the writeback data, to grant the request for ownership of the cache line to the first cache can be based on the data traffic source type and the CLOS ID.

Example 7. The apparatus of example 1, the request for ownership can be received via a PCIe TLP request, the PCIe request TLP to include information to indicate the request for ownership can be to the second cache resident on the first die.

Example 8. The apparatus of example 7, the information to indicate the request for ownership is to the second cache can be an absence of a CLOS ID for the first cache. The CLOS ID can be associated with a cache line address at the first cache, to grant the request for ownership of the cache line to the second cache can be based on the data traffic source type and the absence of the CLOS ID.

Example 9. The apparatus of example 1, the request for ownership can be received via a PCIe TLP. The PCIe request TLP can include information in TPH bits to indicate a dynamic or static selection of a DDIO mode to cause the writeback data to be stored to the cache line address for the cache line. The selected DDIO mode can include one of a dynamic allocation that includes granting the request for ownership of the cache line for either the first cache or for the second cache, a core cache allocation that includes granting the request for ownership of the cache line for only the first cache, or an I/O cache allocation that includes granting the request for ownership of the cache line for only the second cache.

Example 10. The apparatus of example 1, the data traffic source type associated with the I/O agent can be an IOMMU, a CXL type 1 or type 2 device, an accelerator, a NIC or an IPU.

Example 11. An example method can include receiving, by circuitry at a first die of a multi-die system, a request for ownership of a cache line for an I/O agent of an I/O device to writeback data to the cache line for a core of a processor to obtain and process the writeback data. The cache line can be associated with a first cache resident on a second die of the multi-die system that also includes the core or can be associated with a second cache resident on the first die. The method can also include granting the request for ownership of the cache line based, at least in part, on a data traffic source type associated with the I/O agent. The granted request can cause the writeback data to be stored to a cache line address for the cache line.

Example 12. The method of example 11, the first cache resident on the second die can be an L3 cache shared by the core with other cores of the processor.

Example 13. The method of example 11, the I/O agent and I/O device can be resident on a third die of the multi-die system.

Example 14. The method of example 13, the circuitry at the first die can be communicatively coupled to the I/O agent resident on the third die via a chip-to-chip interconnect network arranged to operate according to the UCIe specification.

Example 15. The method of example 11, the request for ownership can be received via a PCIe TLP request. The PCIe request TLP can include information to indicate the request for ownership is to the first cache resident on the second die.

Example 16. The method of example 15, the information to indicate the request for ownership is to the first cache can be a CLOS ID for the first cache. The CLOS ID can be associated with the cache line address to store the writeback data, granting the request for ownership of the cache line to the first cache can be based on the data traffic source type and the CLOS ID.

Example 17. The method of example 11, the request for ownership can be received via a PCIe TLP request. The PCIe request TLP can include information to indicate the request for ownership is to the second cache resident on the first die.

Example 18. The method of example 17, the information to indicate the request for ownership is to the second cache can be an absence of a CLOS ID for the first cache. The CLOS ID can be associated with a cache line address at the first cache, granting the request for ownership of the cache line to the second cache can be based on the data traffic source type and the absence of the CLOS ID.

Example 19. The method of example 11, the request for ownership can be received via a PCIe TLP. The PCIe request TLP can include information in TPH bits to indicate a dynamic or static selection of a DDIO mode to cause the writeback data to be stored to the cache line address for the cache line. The selected DDIO mode can include one of a dynamic allocation that includes granting the request for ownership of the cache line for either the first cache or for the second cache, a core cache allocation that includes granting the request for ownership of the cache line for only the first cache, or an I/O cache allocation that includes granting the request for ownership of the cache line for only the second cache.

Example 20. The method of example 11, the data traffic source type associated with the I/O agent can be an IOMMU, a CXL type 1 or type 2 device, an accelerator, a NIC or an IPU.

Example 21. An example at least one machine readable medium can include a plurality of instructions that in response to being executed by a circuitry of a multi-die system can cause the circuitry to carry out a method according to any one of examples 11 to 20.

Example 22. An example apparatus can include means for performing the methods of any one of examples 11 to 20.

Example 23. An example at least one machine readable medium can include a plurality of instructions that in response to being executed by circuitry at a first die of a multi-die system, can cause the circuitry to receive a request for ownership of a cache line for an I/O agent of an I/O device to writeback data to the cache line for a core of a processor to obtain and process the writeback data. The cache line can be associated with a first cache resident on a second die of the multi-die system that also includes the core or is associated with a second cache resident on the first die. The instructions can also cause the circuitry to grant the request for ownership of the cache line based, at least in part, on a data traffic source type associated with the I/O agent. The granted request can cause the writeback data to be stored to a cache line address for the cache line.

Example 24. The at least one machine readable medium of example 23, the first cache resident on the second die can be a L3 cache shared by the core with other cores of the processor.

Example 25. The at least one machine readable medium of example 23, wherein the I/O agent and I/O device can be resident on a third die of the multi-die system.

Example 26. The at least one machine readable medium of example 25, the circuitry at the first die can be communicatively coupled to the I/O agent resident on the third die via a chip-to-chip interconnect network arranged to operate according to the UCIe specification.

Example 27. The at least one machine readable medium of example 23, the request for ownership can be received via a PCIe TLP request. The PCIe request TLP can include information to indicate the request for ownership is to the first cache resident on the second die.

Example 28. The at least one machine readable medium of example 27, the information to indicate the request for ownership is to the first cache can be a CLOS ID for the first cache. The CLOS ID can be associated with the cache line address to store the writeback data. Granting the request for ownership of the cache line to the first cache can be based on the data traffic source type and the CLOS ID.

Example 29. The at least one machine readable medium of example 23, the request for ownership can be received via a PCIe TLP request. The PCIe request TLP can include information to indicate the request for ownership is to the second cache resident on the first die.

Example 30. The at least one machine readable medium of example 29, the information to indicate the request for ownership is to the second cache can be an absence of a CLOS ID for the first cache. The CLOS ID can be associated with a cache line address at the first cache. Granting the request for ownership of the cache line to the second cache can be based on the data traffic source type and the absence of the CLOS ID.

Example 31. The at least one machine readable medium of example 23, the request for ownership can be received via a PCIe TLP. The PCIe request TLP can include information in TPH bits to indicate a dynamic or static selection of a DDIO mode to cause the writeback data to be stored to the cache line address for the cache line. The selected DDIO mode can include one of a dynamic allocation that includes granting the request for ownership of the cache line for either the first cache or for the second cache, core cache allocation that includes granting the request for ownership of the cache line for only the first cache, or an I/O cache allocation that includes granting the request for ownership of the cache line for only the second cache.

Example 32. The at least one machine readable medium of example 23, the data traffic source type associated with the I/O agent can be an IOMMU, a CXL type 1 or type 2 device, an accelerator, a NIC or an IPU.

Example 33. An example multi-die system can include a first die arranged to have an I/O agent of an I/O device resident on the first die. The multi-die system can also include a second die arranged to have a core of a processor and a first cache resident on the second die. The multi-die system can also include a third die arranged to have circuitry and a second cache resident on the third die. For these examples, the circuitry can receive a request for ownership of a cache line for the I/O agent to writeback data to the cache line for the core of the processor to obtain and process the writeback data. The cache line can be associated with the first cache or can be associated with the second cache. The circuitry may also grant the request for ownership of the cache line based, at least in part, on a data traffic source type associated with the I/O agent, the granted request to cause the writeback data to be stored to a cache line address for the cache line.

Example 34. The multi-die system of example 33, the first cache can be an L3 cache arranged to be shared by the core with other cores of the processor.

Example 35. The multi-die system of example 33, the circuitry can be arranged to be communicatively coupled to the I/O agent resident on the third die via a chip-to-chip interconnect network arranged to operate according to the UCIe specification.

Example 36. The multi-die system of example 33, wherein the request for ownership can be received via a PCIe TLP request. The PCIe request TLP can include information to indicate the request for ownership is to the first cache.

Example 37. The multi-die system of example 36, the information to indicate the request for ownership is to the first cache can be a CLOS ID for the first cache. The CLOS ID can be associated with the cache line address to store the writeback data. Granting the request for ownership of the cache line to the first cache can be based on the data traffic source type and the CLOS ID.

Example 38. The multi-die system of example 33, the request for ownership can be received via a PCIe TLP request. The PCIe request TLP can include information to indicate the request for ownership is to the second cache.

Example 39. The multi-die system of example 38, the information to indicate the request for ownership is to the second cache can be an absence of a CLOS ID for the first cache. The CLOS ID can be associated with a cache line address at the first cache. Granting the request for ownership of the cache line to the second cache can be based on the data traffic source type and the absence of the CLOS ID.

Example 40. The multi-die system of example 33, the request for ownership can be received via a PCIe TLP. The PCIe request TLP can include information in TPH bits to indicate a dynamic or static selection of a DDIO mode to cause the writeback data to be stored to the cache line address for the cache line. The selected DDIO mode can include one of a dynamic allocation that includes granting the request for ownership of the cache line for either the first cache or for the second cache, a core cache allocation that includes granting the request for ownership of the cache line for only the first cache, or an I/O cache allocation that includes granting the request for ownership of the cache line for only the second cache.

Example 41. The multi-die system of example 33, the data traffic source type associated with the I/O agent can be an IOMMU, a CXL type 1 or type 2 device, an accelerator, a NIC or an IPU.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:

a first die arranged to be included in a multi-die system; and circuitry to:

receive a request for ownership of a cache line for an input/output (I/O) agent of an I/O device to writeback data to the cache line for a core of a processor to obtain and process the writeback data, wherein the cache line is associated with a first cache resident on a second die of the multi-die system that also includes the core or is associated with a second cache resident on the first die; and grant the request for ownership of the cache line based, at least in part, on a data traffic source type associated with the I/O agent, the granted request to cause the writeback data to be stored to a cache line address for the cache line.

2. The apparatus of claim 1, the first cache resident on the second die comprising a level 3 (L3) cache shared by the core with other cores of the processor.

3. The apparatus of claim 1, wherein the I/O agent and I/O device are resident on a third die of the multi-die system.

4. The apparatus of claim 3, wherein the circuitry is communicatively coupled to the I/O agent resident on the third die via a chip-to-chip interconnect network arranged to operate according to a Universal Chiplet Interconnect Express (UCIe) specification.

5. The apparatus of claim 1, wherein the request for ownership is to be received via a PCI Express (PCIe) request transaction layer packet (TLP) request, the PCIe request TLP to include information to indicate the request for ownership is to the first cache resident on the second die.

6. The apparatus of claim 5, the information to indicate the request for ownership is to the first cache comprises a class of service (CLOS) identifier (ID) for the first cache, the CLOS ID associated with the cache line address to store the writeback data, wherein to grant the request for ownership of the cache line to the first cache is based on the data traffic source type and the CLOS ID.

7. The apparatus of claim 1, wherein the request for ownership is to be received via a PCI Express (PCIe) request transaction layer packet (TLP) request, the PCIe request TLP to include information to indicate the request for ownership is to the second cache resident on the first die.

8. The apparatus of claim 7, the information to indicate the request for ownership is to the second cache comprises an absence of a class of service (CLOS) identifier (ID) for the first cache, the CLOS ID associated with a cache line address at the first cache, wherein to grant the request for ownership of the cache line to the second cache is based on the data traffic source type and the absence of the CLOS ID.

9. The apparatus of claim 1, wherein the request for ownership is to be received via a PCI Express (PCIe) request transaction layer packet (TLP), the PCIe request TLP to include information in TLP processing hint (TPH) bits to indicate a dynamic or static selection of a data direct I/O (DDIO) mode to cause the writeback data to be stored to the cache line address for the cache line, the selected DDIO mode to include one of a dynamic allocation that includes granting the request for ownership of the cache line for either the first cache or for the second cache, a core cache allocation that includes granting the request for ownership of the cache line for only the first cache, or an I/O cache allocation that includes granting the request for ownership of the cache line for only the second cache.

10. The apparatus of claim 1, the data traffic source type associated with the I/O agent comprises an input output memory management unit (IOMMU), a Compute Express Link (CXL) type 1 or type 2 device, an accelerator, a network interface controller (NIC), or an infrastructure processing unit (IPU).

11. A method comprising:

receiving, by circuitry at a first die of a multi-die system, a request for ownership of a cache line for an input/output (I/O) agent of an I/O device to writeback data to the cache line for a core of a processor to obtain and process the writeback data, wherein the cache line is associated with a first cache resident on a second die of the multi-die system that also includes the core or is associated with a second cache resident on the first die; and granting the request for ownership of the cache line based, at least in part, on a data traffic source type associated with the I/O agent, the granted request to cause the writeback data to be stored to a cache line address for the cache line.

12. The method of claim 11, the first cache resident on the second die comprising a level 3 (L3) cache shared by the core with other cores of the processor.

13. The method of claim 11, wherein the I/O agent and I/O device are resident on a third die of the multi-die system and the circuitry at the first die is communicatively coupled to the I/O agent resident on the third die via a chip-to-chip interconnect network arranged to operate according to a Universal Chiplet Interconnect Express (UCIe) specification.

14. The method of claim 11, wherein the request for ownership is to be received via a PCI Express (PCIe) request transaction layer packet (TLP) request, the PCIe request TLP to include information to indicate the request for ownership is to the first cache resident on the second die and to indicate a class of service (CLOS) identifier (ID) for the first cache, the CLOS ID associated with the cache line address to store the writeback data, wherein granting the request for ownership of the cache line to the first cache is based on the data traffic source type and the CLOS ID.

15. The method of claim 11, wherein the request for ownership is to be received via a PCI Express (PCIe) request transaction layer packet (TLP) request, the PCIe request TLP to include information to indicate the request for ownership is to the second cache resident on the first die and to indicate an absence of a class of service (CLOS) identifier (ID) for the first cache, the CLOS ID associated with a cache line address at the first cache, wherein granting the request for ownership of the cache line to the second cache is based on the data traffic source type and the absence of the CLOS ID.

16. The method of claim 11, wherein the request for ownership is to be received via a PCI Express (PCIe) request transaction layer packet (TLP), the PCIe request TLP to include information in TLP processing hint (TPH) bits to indicate a dynamic or static selection of a data direct I/O (DDIO) mode to cause the writeback data to be stored to the cache line address for the cache line, the selected DDIO mode to include one of a dynamic allocation that includes granting the request for ownership of the cache line for either the first cache or for the second cache, a core cache allocation that includes granting the request for ownership of the cache line for only the first cache, or an I/O cache allocation that includes granting the request for ownership of the cache line for only the second cache.

17. At least one non-transitory machine readable medium comprising a plurality of instructions that in response to being executed by circuitry at a first die of a multi-die system, cause the circuitry to:

receive a request for ownership of a cache line for an input/output (I/O) agent of an I/O device to writeback data to the cache line for a core of a processor to obtain and process the writeback data, wherein the cache line is associated with a first cache resident on a second die of the multi-die system that also includes the core or is associated with a second cache resident on the first die; and grant the request for ownership of the cache line based, at least in part, on a data traffic source type associated with the I/O agent, the granted request to cause the writeback data to be stored to a cache line address for the cache line.

18. The at least one non-transitory machine readable medium of claim 17, the first cache resident on the second die comprising a level 3 (L3) cache shared by the core with other cores of the processor.

19. The at least one non-transitory machine readable medium of claim 17, wherein the I/O agent and I/O device are resident on a third die of the multi-die system and the circuitry at the first die is communicatively coupled to the I/O agent resident on the third die via a chip-to-chip interconnect network arranged to operate according to a Universal Chiplet Interconnect Express (UCIe) specification.

20. The at least one non-transitory machine readable medium of claim 17, wherein the request for ownership is to be received via a PCI Express (PCIe) request transaction layer packet (TLP) request, the PCIe request TLP to include information to indicate the request for ownership is to the first cache resident on the second die and to indicate a class of service (CLOS) identifier (ID) for the first cache, the CLOS ID associated with the cache line address to store the writeback data, wherein to grant the request for ownership of the cache line to the first cache is based on the data traffic source type and the CLOS ID.

21. The at least one non-transitory machine readable medium of claim 17, wherein the request for ownership is to be received via a PCI Express (PCIe) request transaction layer packet (TLP) request, the PCIe request TLP to include information to indicate the request for ownership is to the second cache resident on the first die and to indicate an absence of a class of service (CLOS) identifier (ID) for the first cache, the CLOS ID associated with a cache line address at the first cache, wherein to grant the request for ownership of the cache line to the second cache is based on the data traffic source type and the absence of the CLOS ID.

22. The at least one non-transitory machine readable medium of claim 17, wherein the request for ownership is to be received via a PCI Express (PCIe) request transaction layer packet (TLP), the PCIe request TLP to include information in TLP processing hint (TPH) bits to indicate a dynamic or static selection of a data direct I/O (DDIO) mode to cause the writeback data to be stored to the cache line address for the cache line, the selected DDIO mode to include one of a dynamic allocation that includes granting the request for ownership of the cache line for either the first cache or for the second cache, a core cache allocation that includes granting the request for ownership of the cache line for only the first cache, or an I/O cache allocation that includes granting the request for ownership of the cache line for only the second cache.

23. A multi-die system comprising:

a first die arranged to have an input/output (I/O) agent of an I/O device resident on the first die;

a second die arranged to have a core of a processor and a first cache resident on the second die; and a third die arranged to have circuitry and a second cache resident on the third die, the circuitry to:

receive a request for ownership of a cache line for the I/O agent to writeback data to the cache line for the core of the processor to obtain and process the writeback data, wherein the cache line is associated with the first cache or is associated with the second cache; and grant the request for ownership of the cache line based, at least in part, on a data traffic source type associated with the I/O agent, the granted request to cause the writeback data to be stored to a cache line address for the cache line.

24. The multi-die system of claim 23, the first cache comprising a level 3 (L3) cache arranged to be shared by the core with other cores of the processor.

25. The multi-die system of claim 23, wherein the circuitry is arranged to be communicatively coupled to the I/O agent resident on the third die via a chip-to-chip interconnect network arranged to operate according to a Universal Chiplet Interconnect Express (UCIe) specification.

26. The multi-die system of claim 23, wherein the request for ownership is to be received via a PCI Express (PCIe) request transaction layer packet (TLP) request, the PCIe request TLP to include information to indicate the request for ownership is to the first cache and to indicate a class of service (CLOS) identifier (ID) for the first cache, the CLOS ID associated with the cache line address to store the writeback data, wherein to grant the request for ownership of the cache line to the first cache is based on the data traffic source type and the CLOS ID.

27. The multi-die system of claim 23, wherein the request for ownership is to be received via a PCI Express (PCIe) request transaction layer packet (TLP) request, the PCIe request TLP to include information to indicate the request for ownership is to the second cache and to indicate a class of service (CLOS) identifier (ID) for the first cache, the CLOS ID associated with a cache line address at the first cache, wherein to grant the request for ownership of the cache line to the second cache is based on the data traffic source type and an absence of the CLOS ID.

28. The multi-die system of claim 23, wherein the request for ownership is to be received via a PCI Express (PCIe) request transaction layer packet (TLP), the PCIe request TLP to include information in TLP processing hint (TPH) bits to indicate a dynamic or static selection of a data direct I/O (DDIO) mode to cause the writeback data to be stored to the cache line address for the cache line, the selected DDIO mode to include one of a dynamic allocation that includes granting the request for ownership of the cache line for either the first cache or for the second cache, a core cache allocation that includes granting the request for ownership of the cache line for only the first cache, or an I/O cache allocation that includes granting the request for ownership of the cache line for only the second cache.

29. The multi-die system of claim 23, the data traffic source type associated with the I/O agent comprises an input output memory management unit (IOMMU), a Compute Express Link (CXL) type 1 or type 2 device, an accelerator, a network interface controller (NIC), or an infrastructure processing unit (IPU).

* * * * *